United States Patent
Tabor et al.

(10) Patent No.: US 10,934,390 B2
(45) Date of Patent: Mar. 2, 2021

(54) POLYESTER POLYOLS WITH INCREASED CLARITY

(71) Applicant: RESINATE MATERIALS GROUP, INC., Plymouth, MI (US)

(72) Inventors: Rick Tabor, Plymouth, MI (US); Eric D. Vrabel, Ferndale, MI (US)

(73) Assignee: RESINATE MATERIALS GROUP, INC., Plymouth, MI (US)

( * ) Notice: Subject to any disclaimer, the term of this patent is extended or adjusted under 35 U.S.C. 154(b) by 207 days.

(21) Appl. No.: 15/730,105

(22) Filed: Oct. 11, 2017

(65) Prior Publication Data

US 2018/0030202 A1  Feb. 1, 2018

Related U.S. Application Data

(63) Continuation of application No. PCT/US2016/026337, filed on Apr. 7, 2016.

(60) Provisional application No. 62/147,261, filed on Apr. 14, 2015, provisional application No. 62/182,932, filed on Jun. 22, 2015, provisional application No. 62/251,257, filed on Nov. 5, 2015.

(51) Int. Cl.
```
C08G 63/12      (2006.01)
C08G 18/42      (2006.01)
C08G 63/64      (2006.01)
C08G 63/195     (2006.01)
C08G 63/688     (2006.01)
C08G 63/91      (2006.01)
C08J 11/10      (2006.01)
```

(52) U.S. Cl.
CPC .......... *C08G 63/12* (2013.01); *C08G 18/42* (2013.01); *C08G 18/4225* (2013.01); *C08G 18/4288* (2013.01); *C08G 63/195* (2013.01); *C08G 63/64* (2013.01); *C08G 63/6886* (2013.01); *C08G 63/916* (2013.01); *C08J 11/10* (2013.01); *Y02P 20/582* (2015.11)

(58) Field of Classification Search
CPC ...... C08G 63/12; C08G 63/64; C08G 63/195; C08G 63/6886; C08G 63/916; C08G 18/4225; C08G 18/42; C08G 18/4288; C08J 11/10; Y02P 20/582
See application file for complete search history.

(56) References Cited

U.S. PATENT DOCUMENTS

| | | |
|---|---|---|
| 2,793,220 A | 5/1957 | Barrett et al. |
| 3,647,759 A | 3/1972 | Walker |
| 4,371,469 A | 2/1983 | Foglia et al. |
| 4,411,949 A | 10/1983 | Snider et al. |
| 4,521,547 A | 6/1985 | Anderson |
| 4,714,717 A | 12/1987 | Londrigan et al. |
| 4,897,429 A | 1/1990 | Trowell et al. |
| 5,075,417 A | 12/1991 | Trowell et al. |
| 5,138,027 A | 8/1992 | Van Beek |
| 5,155,163 A | 10/1992 | Abeywardena et al. |
| 5,502,247 A | 3/1996 | Bartos et al. |
| 5,608,000 A | 3/1997 | Duan et al. |
| 5,763,526 A | 6/1998 | Harakawa et al. |
| 6,229,054 B1 | 5/2001 | Dai et al. |
| 6,281,373 B1 | 8/2001 | Sato et al. |
| 6,339,125 B1 | 1/2002 | Bechara et al. |
| 6,433,121 B1 | 8/2002 | Petrovic et al. |
| 6,630,601 B1 | 10/2003 | Inada et al. |
| 6,635,723 B1 | 10/2003 | Maier et al. |
| 6,642,350 B1 | 11/2003 | Asakawa et al. |
| 7,045,573 B2 | 5/2006 | Mayer et al. |
| 7,192,988 B2 | 3/2007 | Smith et al. |
| 7,342,068 B2 | 3/2008 | Klingenberg et al. |
| 7,858,725 B2 | 12/2010 | Dai et al. |
| 7,994,268 B2 | 8/2011 | Dai et al. |
| 8,263,726 B2 | 9/2012 | Dai et al. |
| 8,598,297 B2 | 12/2013 | Bedri et al. |
| 8,664,352 B2 | 3/2014 | Abraham et al. |
| 2006/0058495 A1* | 3/2006 | Kim ............... C08G 63/195 528/179 |
| 2009/0131625 A1 | 5/2009 | Kurian et al. |
| 2009/0287007 A1 | 11/2009 | Abraham et al. |
| 2011/0065832 A1 | 3/2011 | Dai et al. |
| 2011/0065882 A1 | 3/2011 | Dai et al. |
| 2011/0065883 A1 | 3/2011 | Dai et al. |
| 2011/0065947 A1 | 3/2011 | Dai et al. |
| 2011/0118495 A1 | 5/2011 | Dai et al. |
| 2011/0313124 A1 | 12/2011 | Yalamanchili et al. |

(Continued)

FOREIGN PATENT DOCUMENTS

| | | | | |
|---|---|---|---|---|
| CA | 104511 A | | 4/1907 | |
| CA | 2714083 A1 * | | 4/2011 | ........... C08G 63/193 |

(Continued)

OTHER PUBLICATIONS

Paszun et al., Chemical Recycling of Poly(ethylene terephthalate), Ind. Eng. Chem. Res. 1997, 36, 1373.

(Continued)

*Primary Examiner* — Rabon A Sergent
(74) *Attorney, Agent, or Firm* — Dilworth IP, LLC

(57) ABSTRACT

Polyester polyols, processes for making them, and applications for the polyols are disclosed. Some of the polyols comprise recurring units from a digested thermoplastic polyester (e.g., recycled polyethylene terephthalate), a diol, an optional hydrophobe, and a clarifier. The clarifier, which in some cases is a bisphenol, bisphenol alkoxylate, bisphenol polycarbonate, sulfonyl diphenol, or sulfonyl diphenol alkoxylate, helps the polyol remain clear for weeks or months after its preparation. In some aspects, the clarifier is a monophenol, bisphenol, or poly-phenol having two or more phenylene rings wherein at least two of the phenylene rings lack a common molecular axis. The clarifier may also be an alkylated phenol, an epoxy resin, an epoxy novolac resin, a diphenylmethane, or a tris(aryloxy)phosphate. The polyols are valuable for formulating a variety of polyurethanes and related products—including polyurethane dispersions, flexible and rigid foams, coatings, adhesives, sealants, and elastomers—and they provide a sustainable alternative to bio- or petrochemical-based polyols.

18 Claims, No Drawings

(56) References Cited

U.S. PATENT DOCUMENTS

2012/0136169 A1    5/2012  Abraham et al.
2013/0251975 A1    9/2013  Kampf
2015/0051304 A1    2/2015  Shieh

FOREIGN PATENT DOCUMENTS

EP      1178062 A1      2/2002
WO   2000/075252 A1    12/2000
WO   2006/012344 A1     6/2004
WO   2009/058367 A1     5/2009
WO   2014/075051 A1     5/2014

OTHER PUBLICATIONS

J. Scheirs and T. Long, eds, Modern Polyesters: Chemistry and Technology of Polyesters and Copolyesters, Wiley Series in Polymer Science, 2003, John Wiley & Sons, Ltd. Hoboken, NJ, 79 pages.
Handbook of Thermoplastics, O. Olabisi, ed., 1997, Marcel Dekker, Ch. 18-20.
D. Babb et al., Polym. Preprints 48 (2007) 855.
Tran et al., J. Am. Oil Chem. Soc. 82 (2005) 653.
N. Ikladious, J. Elast. Plast. 32 (2000) 140.
K. Troev et al., J. Appl. Polym. Sci. 90 (2003) 1148.
PCT International Search Report and Written Opinion dated Jun. 23, 2016 from corresponding Application No. PCT/US2016/026337.

* cited by examiner

POLYESTER POLYOLS WITH INCREASED CLARITY

FIELD OF THE INVENTION

The invention relates to polyester polyol compositions produced from thermoplastic polyesters. The polyols have improved clarity and are useful for formulating polyurethanes and other products.

BACKGROUND OF THE INVENTION

Aromatic polyester polyols are commonly used intermediates for the manufacture of polyurethane products, including flexible and rigid foams, polyisocyanurate foams, coatings, sealants, adhesives, and elastomers. The aromatic content of these polyols contributes to strength, stiffness, and thermal stability of the urethane product.

Commonly, the aromatic polyester polyol is made by condensing aromatic diacids, diesters, or anhydrides (e.g., terephthalic acid, dimethyl terephthalate) with glycols such as ethylene glycol, propylene glycol, diethylene glycol, or the like. These starting materials usually derive exclusively from petrochemical sources.

As companies increasingly seek to offer products with improved sustainability, the availability of intermediates produced from bio-renewable and/or recycled materials becomes more leveraging. However, there remains a need for these products to deliver equal or better performance than their traditional petroleum-based alternatives at a comparable price point.

Bio-renewable content alone can be misleading as an indicator of "green" chemistry. For example, when a food source such as corn is needed to provide the bio-renewable content, there are clear trade-offs between feeding people and providing them with performance-based chemical products. Additionally, the chemical or biochemical transformations needed to convert sugars or other bio-friendly feeds to useful chemical intermediates such as polyols can consume more natural resources and energy and can release more greenhouse gases and pollutants into the environment than their petro-based alternatives in the effort to achieve "green" status.

Waste thermoplastic polyesters, including waste polyethylene terephthalate (PET) streams (e.g., from plastic beverage containers), provide an abundant source of raw material for making new polymers. Usually, when PET is recycled, it is used to make new PET beverage bottles, PET fiber, or it is chemically transformed to produce polybutylene terephthalate (PBT). Other recycled raw materials are also available. For example, recycled propylene glycol is available from aircraft or RV deicing and other operations, and recycled ethylene glycol is available from spent vehicle coolants.

Urethane formulators demand polyols that meet required specifications for color, clarity, hydroxyl number, functionality, acid number, viscosity, and other properties. These specifications will vary and depend on the type of urethane application. For instance, rigid foams generally require polyols with higher hydroxyl numbers than the polyols used to make flexible foams.

Polyols suitable for use in making high-quality polyurethanes have proven difficult to manufacture from recycled materials, including recycled polyethylene terephthalate (rPET). Many references describe digestion of rPET with glycols (also called "glycolysis"), usually in the presence of a catalyst such as zinc, titanium, or tin. Digestion converts the polymer to a mixture of glycols and low-molecular-weight PET oligomers. Although such mixtures have desirably low viscosities, they often have high hydroxyl numbers or high levels of free glycols. Frequently, the target product is a purified bis(hydroxyalkyl) terephthalate (see, e.g., U.S. Pat. Nos. 6,630,601, 6,642,350, and 7,192,988) or terephthalic acid (see, e.g., U.S. Pat. No. 5,502,247). Some of the efforts to use glycolysis product mixtures for urethane manufacture are described in a review article by D. Paszun and T. Spychaj (*Ind. Eng. Chem. Res.* 36 (1997) 1373).

Most frequently, ethylene glycol is used as the glycol reactant for glycolysis. This is sensible because it minimizes the possible reaction products. Usually, the glycolysis is performed under conditions effective to generate bis(hydroxyethyl) terephthalate ("BHET"), although sometimes the goal is to recover pure terephthalic acid. When ethylene glycol is used as a reactant, the glycolysis product is typically a crystalline or waxy solid at room temperature. Such materials are less than ideal for use as polyol intermediates because they must be processed at elevated temperatures. Polyols are desirably free-flowing liquids at or close to room temperature.

Recently, we found that modification of digested thermoplastic polymers (such as recycled PET) with hydrophobic materials can provide polyester polyols with low viscosity, desirable hydroxyl numbers, high recycle content, and other desirable attributes. A remaining challenge is to find ways to produce polyester polyols from recycled thermoplastics that remain clear upon prolonged storage. The problem is particularly challenging when the polyester polyol has a high aromatic ring content, especially terephthalate content, as in the case of polyester polyols made from recycled PET, PBT, polytrimethylene terephthalate (PTT), Eastman Tritan™ polyester, and similar polymers. Although the hydrophobe-modified polyester polyols we produced earlier are often clear immediately following preparation, they tend to become opaque within a week at room temperature.

Improved polyols are needed. In particular, the urethane industry needs sustainable polyols based in substantial part on recycled polymers such as the practically unlimited supply of recycled polyethylene terephthalate. Polyols with high recycle content that satisfy the demanding color, viscosity, functionality, and hydroxyl content requirements of polyurethane formulators would be valuable. Of particular interest are polyols that can retain their clarity for weeks, months, or longer after production.

SUMMARY OF THE INVENTION

The invention relates to polyester polyols, methods for producing them, and applications for the polyols.

In one aspect, the polyester polyol comprises recurring units from a digested thermoplastic polymer, a diol, an optional hydrophobe, and a clarifier. The clarifier, which is present in an amount within the range of 0.1 to 50 wt. %, is selected from bisphenols, bisphenol alkoxylates, bisphenol polycarbonates, sulfonyl diphenols, and sulfonyl diphenol alkoxylates. The polyol has a hydroxyl number within the range of 25 to 800 mg KOH/g. Additionally, the polyol has a seven-day % transmittance at 900 nm as measured herein of at least 30%. In other aspects, the clarifier is an alkylated phenol, an epoxy resin, an epoxy novolac resin, a diphenylmethane, or a tris(aryloxy)phosphate.

The invention includes methods for producing a polyester polyol as described above. One method comprises: (a) reacting a thermoplastic polyester, a diol, and optionally a hydrophobe at a temperature within the range of 80 to 250°

C. to produce a digested intermediate; and (b) reacting the digested intermediate with 0.1 to 50 wt. % of a clarifier as described above. Another inventive method comprises reacting a thermoplastic polyester, a diol, an optional hydrophobe, and the clarifier in a single step.

In another aspect, the invention relates to a composition comprising an essentially transparent polyester polyol. The polyol comprises recurring units of a terephthalate source, a diol, and a bis- or poly-phenol having two or more phenylene rings, wherein at least two of the phenylene rings lack a common molecular axis.

In yet another aspect, the essentially transparent polyester polyol comprises recurring units of a terephthalate source, a diol, and a monophenolic compound having two or more phenylene rings, wherein at least two of the phenylene rings lack a common molecular axis.

Further, the invention includes a composition comprising an essentially transparent polyester polyol comprising recurring units of a terephthalate source and a diol. The composition further comprises a non-phenolic aromatic compound having two or more phenylene rings, wherein at least two of the phenylene rings lack a common molecular axis.

We surprisingly found that high-recycle-content polyester polyols having good transparency after weeks or months of storage at room temperature can be made from recycled thermoplastics. The polyols have desirable hydroxyl numbers, viscosities, functionalities, and other attributes. The polyols are valuable for formulating a variety of polyurethanes and related products—including polyurethane dispersions, flexible and rigid foams, coatings, adhesives, sealants, and elastomers—and they provide a sustainable alternative to bio- or petrochemical-based polyols.

DETAILED DESCRIPTION OF THE INVENTION

In one aspect, the polyol comprises recurring units from a digested thermoplastic polyester, a diol, an optional hydrophobe, and a clarifier.

Thermoplastic Polyesters

Thermoplastic polyesters suitable for use are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates (e.g., polyhydroxybutyrate); copolymers of 2,2,4,4-tetramethyl-1,3-cyclobutanediol with isophthalic acid, terephthalic acid or orthophthalic derivatives; polyethylene furanoate; dihydroferulic acid polymers (e.g., poly(dihydroferulic acid) and poly(dihydroferulic acid-co-ferulic acid); see PCT Internat. Appl. No. WO 2014/075057, the teachings of which are incorporated herein by reference), and the like, and mixtures thereof. Further examples of thermoplastic polyesters are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof. In a preferred aspect, polyethylene terephthalate, especially recycled polyethylene terephthalate (rPET), virgin PET, recycled PTT, and mixtures thereof, is used. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. Another source of PET or PTT can be either post-industrial or post-consumer PTT or PET carpet. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

In some aspects, the polyester polyol comprises recurring units from a digested thermoplastic polyester. "Digested" refers to a reaction product generated by reacting the thermoplastic polyester with one or more glycols, optionally in the presence of a catalyst, under conditions effective to at least partially depolymerize the thermoplastic polyester to produce oligomeric materials.

Diols

Diols suitable for use are well known. By "diol," we mean a linear or branched, aliphatic or cycloaliphatic compound or mixture of compounds having two or more hydroxyl groups. Other functionalities, particularly ether or ester groups, may be present in the diol. In preferred diols, two of the hydroxyl groups are separated by from 2 to 10 carbons, preferably 2 to 5 carbons. Suitable diols include, for example, ethylene glycol, propylene glycol, 1,3-propanediol, 1,2-butylene glycol, 1,3-butylene glycol, 1,4-butanediol, 2-methyl-1,3-propanediol, pentaerythritol, sorbitol, neopentyl glycol, glycerol, trimethylolpropane, 2,2,4,4-tetramethyl-1,3-cyclobutanediol, 3-methyl-1,5-pentanediol, 1,4-cyclohexanedimethanol, 1,3-cyclohexanedimethanol, bisphenol A ethoxylates, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. In some aspects, the diol is selected from propylene glycol, 2-methyl-1,3-propanediol, 3-methyl-1,5-pentanediol, neopentyl glycol, diethylene glycol, polyethylene glycol having a number average molecular weight of about 200, and mixtures thereof. Propylene glycol is particularly preferred. In a preferred aspect, the diol is a recycled glycol, especially recycled propylene glycol. Propylene glycol recovered from used deicing fluids is one example.

Optional Hydrophobes

In some aspects, the polyester polyol may incorporate recurring units from one or more hydrophobes. When a hydrophobe is included, it is preferably included in an amount within the range of 1 to 70 wt. % based on the amount of thermoplastic polyester. In other aspects, the hydrophobe may present in an amount within the range of 2 to 50 wt. %, or 3 to 40 wt. %, or 5 to 30 wt. %, based on the amount of thermoplastic polyester.

Suitable hydrophobes are well known. Examples include dimer fatty acids, oleic acid, ricinoleic acid, tung oil, corn oil, canola oil, soybean oil, sunflower oil, triglycerides or alkyl carboxylate esters having saturated or unsaturated $C_6$-$C_{36}$ fatty acid units, castor oil, alkoxylated castor oil, saturated or unsaturated $C_6$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or fatty acids, and mixtures thereof. The hydrophobes are well-suited to be reacted with glycol-digested thermoplastic polyesters. The resulting products can be non-viscous, pourable liquids that usually have good initial transparency, low particulates, and little or no tendency to phase separate.

Dimer fatty acids are suitable hydrophobes. Dimer fatty acids are made by dimerizing unsaturated fatty acids (e.g., oleic acid, linoleic acid, linolenic acid, ricinoleic acid) in the presence of a catalyst, such as a bentonite or montmorillonite clay. Commercially available dimer fatty acids are usually mixtures of products in which the dimerized product predominates. Some commercial dimer acids are made by dimerizing tall oil fatty acids. Dimer fatty acids frequently have 36 carbons and two carboxylic acid groups. They may be saturated or unsaturated. They may also be hydrogenated to remove unsaturation. In a preferred aspect, the dimer fatty acid comprises dimerized oleic acid, trimerized oleic acid, dimerized linoleic acid, trimerized linolelic acid, dimerized linolenic acid, trimerized linolenic acid, or mixtures thereof. Suitable dimer fatty acids include Pripol™ dimer fatty acids (products of Croda) such as Pripol™ 1006, 1009, 1010, 1012, 1013, 1017, 1022, 1025, 1027, 1029, 1036, and 1098; Unidyme™ dimer acids (products of Arizona Chemical) such as Unidyme 10, 14, 18, 22, 35, M15, and M35; dimer acids available from Emery Oleochemicals, and FloraDyme™ dimer acids from Florachem Corporation. Methods for synthesizing dimer fatty acids suitable for use are also known. Fatty acids having at least one carbon-carbon double bond are dimerized in the presence of a catalyst such as a montmorillonite, kaolinite, hectorite, or attapulgite clay (see, e.g., U.S. Pat. Nos. 2,793,220, 4,371,469, 5,138,027, and 6,281,373, the teachings of which are incorporated herein by reference; see also WO 2000/075252 and CA 104511).

Oleic acid is a suitable hydrophobe. Oleic acid is ubiquitous in nature as a fatty acid and is readily available from saponification of animal and vegetable fats and oils.

Ricinoleic acid (12-hydroxy-9-cis-octadecenoic acid) can be used as the hydrophobe. Castor oil contains 90% or more of ricinoleic acid residues, and is a convenient and primary source of the acid.

Tung oil, also called "China wood oil," is also suitable for use as the hydrophobe. Tung oil is a triglyceride. The principal fatty acid residues (about 82%) are from alpha-eleostearic acid, a $C_{18}$ fatty acid with 9-cis, 11-trans, 13-trans unsaturation. The other fatty acid residues are from linoleic acid (8.5%), palmitic acid (5.5%), and oleic acid (4%). Consequently, tung oil has ester (glyceride) and olefin functionalities, and compared with other oils, it is highly unsaturated.

Other natural oils such as corn oil, canola oil, soybean oil, sunflower oil, and the like, are suitable hydrophobes. Also suitable are triglycerides or alkyl carboxylate esters having saturated or unsaturated $C_6$-$C_{36}$ fatty acid units.

Castor oil and alkoxylated castor oils are also suitable as hydrophobes. Castor oils ethoxylated with various proportions of ethylene oxide, for instance 5 to 100 moles of EO per mole of castor oil, are commercially available. Ethoxylated castor oils have ester (glyceride), olefin, and primary hydroxyl functionalities. Examples include Toximul® 8241, Toximul® 8242, and Toximul® 8244, products of Stepan Company, and the Etocas™ series of ethoxylated castor oils from Croda. Ethoxylated castor oils can also be synthesized using well-known processes by reacting the oil with ethylene oxide in the presence of an alkoxide, Lewis acid, double metal cyanide complex, or other suitable ethoxylation catalyst.

Saturated or unsaturated $C_6$-$C_{18}$ dicarboxylic acids or diols are suitable for use as hydrophobes. Examples include azelaic acid, nonenedioic acid, sebacic acid, decenedioic acid, dodecanedioic acid, dodecenedioic acid, tetradecanedioic acid, tetradecenedioic acid, hexadecanedioic acid, hexadecenedioic acid, octadecanedioic acid, octadecenedioic acid, and the like, and mixtures thereof. Dicarboxylic acids are generally widely available from commercial sources.

Cardanol-based products can also be used as the hydrophobe. Cardanol, the main constituent of cashew nutshell oil, is an alkylated phenol having a linear $C_{15}$ unsaturated alkyl chain. By "cardanol-based products," we mean to include cardanol and products derived from cardanol. Such products may include alkoxylated cardanols, including the hydroxyalkylated compositions described in U.S. Pat. No. 6,229,054, the teachings of which are incorporated herein by reference. Also suitable are "cardanol dimers," which can be made by joining two cardanol groups using a siloxane linker. In some aspects, Mannich chemistry is used to introduce amine functionality as an attachment to the phenolic rings of the cardanol dimers. Other functionalities, such as epoxy groups, can be introduced if desired. Suitable cardanol-based products, including cardanol dimers, are disclosed in U.S. Pat. Nos. 7,858,725; 7,994,268; 8,263,726; U.S. Pat. Appl. Publ. Nos. 2011/0118495; 2011/0065947; 2011/0065883; 2011/0065882; and 2011/0065832, the teachings of which are incorporated herein by reference.

Recycled cooking oils are also suitable hydrophobes. The cooking oils, which contain vegetable oil mixtures, are collected from restaurants or commercial food preparation facilities. Such cooking oils can be used successfully as the hydrophobe component for making polyester polyols having acceptable properties and very high recycle contents. The product may be dark, even after carbon treatment, but its properties are generally consistent with requirements for acceptable polyols.

Branched or linear $C_6$-$C_{36}$ fatty alcohols are suitable hydrophobes. For instance, isostearyl alcohol, a commonly used fatty alcohol available as an article of commerce, is suitable for use. When isostearyl alcohol is used as the hydrophobe, it may be desirable to use a polyol having a hydroxyl functionality greater than 2, e.g., glycerin, to boost the overall average hydroxyl functionality to be within the range of 1.8 to 2.7.

Hydroxy-functional materials derived from epoxidized, ozonized, or hydroformylated fatty esters or fatty acids, also commonly known as "bio-polyols" or "natural oil polyols" are another category of suitable hydrophobes. These products can be made from fatty esters (including natural oils) or fatty acids in several steps. Some products include a step to epoxidize carbon-carbon double bonds in the fatty ester or fatty acid, followed by a ring-opening step. In other products, unsaturation in the fatty ester or fatty acid is hydroformylated and then hydrogenated to introduce the hydroxyl functionality (see, e.g., D. Babb et al., *Polym. Preprints* 48 (2007) 855, PCT Internat. Appl. WO 2006/012344, and U.S.

Pat. No. 8,598,297, the teachings of which are incorporated herein by reference). Polyols made by hydrolysis or alcoholysis of epoxidized soybean oil are among the suitable bio-polyols. BiOH® polyols supplied by Cargill (e.g., BiOH® X-0002) and Agrol® polyols from BioBased Technologies are also suitable. The bio-polyol can also be generated "in situ" from a reaction between the glycol and an epoxidized fatty ester or an epoxidized fatty acid (such as epoxidized soybean oil, epoxidized methyl oleate, epoxidized oleic acid, or epoxidized methyl soyate). Suitable bio-polyols include polyols derived from ozonized fatty esters or ozonized fatty acids, such as mixtures obtained by ozonolysis of a natural oil in the presence of a glycol, as is described by P. Tran et al., *J. Am. Oil Chem. Soc.* 82 (2005) 653. For more examples of suitable bio-polyols, see U.S. Pat. Nos. 6,433,121; 8,664,352, U.S. Publ. Nos. 2012/0136169, 2011/0313124, and 2009/0287007, and PCT Appl. No. WO2009/058367, the teachings of which are incorporated herein by reference.

Clarifiers

In some aspects, the polyester polyols comprise recurring units of a clarifier. The clarifier is selected from bisphenols, bisphenol alkoxylates, bisphenol polycarbonates, sulfonyl diphenols, and sulfonyl diphenol alkoxylates. These classes of clarifiers commonly have at least two phenolic groups separated by a linking group, which in some aspects is carbon or sulfur. In bisphenol A, for instance, two phenolic units are separated by a —$C(CH_3)_2$— group.

Suitable bisphenols include, for example, bisphenol A (from acetone and phenol), bisphenol AP (from acetophenone and phenol), bisphenol AF (from hexafluoroacetone and phenol), bisphenol B (from methyl ethyl ketone and phenol), bisphenol BP (from benzophenone and phenol), bisphenol C (from acetone and cresol), bisphenol E (from acetaldehyde and phenol), bisphenol F (from formaldehyde and phenol), bisphenol G (from acetone and 2-isopropylphenol), bisphenol PH (from acetone and 2-phenylphenol), bisphenol Z (from cyclohexanone and phenol), and the like, and alkoxylates or polycarbonates made from these.

Suitable sulfonyl diphenols include, for example, bisphenol S (from sulfur trioxide and phenol, also known as 4,4'-sulfonyldiphenol), 4,4'-sulfonyldicresol (from sulfur trioxide and cresol), and the like, and alkoxylates or polycarbonates made from these.

Thus, in some aspects, the clarifier may be, for example, bisphenol A, bisphenol F, bisphenol AP, ethoxylated bisphenol A, ethoxylated bisphenol F, 4,4'-sulfonyldiphenol, ethoxylated 4,4'-sulfonyldiphenol, or mixtures thereof.

In other aspects, the clarifier is an alkylated phenol, an epoxy resin, an epoxy novolac resin, a diphenylmethane, or a tris(aryloxy)phosphate.

Suitable alkylated phenols include mono-, di-, and trialkylated phenols. Examples include butylated hydroxytoluene (BHT), butylated hydroxyanisole (BHA), o-, m-, and p-cresols, p-nonylphenol, p-decylphenol, p-dodecylphenol, p-2-ethylhexylphenol, mono-, di-, and tristyrenated phenols, mono-, di- and tristyrenated phenol alkoxylates, and the like, and mixtures thereof.

Suitable epoxy resins include reaction products of bisphenols, especially bisphenol A or bisphenol F, and epichlorohydrin. Preferred epoxy resins are liquid resins having epoxide equivalent weights within the range of 167 to 250 g/eq. Such resins are available commercially from Dow Chemical (D.E.R.™ resins), Hexion (Epon™ resins), and other suppliers. Suitable epoxy resins also include reaction products of polyether polyols and epichlorohydrin, and reaction products of hydrocarbon-phenolic adducts (e.g., adducts of phenols and cyclopentadiene dimers or oligomers) with epichlorohydrin. Combinations of different epoxy resins can be used.

Suitable epoxy novolac resins are multifunctional reaction products of phenol-formaldehyde resins and epichlorohydrin. The resins are also known as "EPN" (epoxy phenol novolac) resins. These resins have epoxide functionalities from 2.2 to 6, typically 2.5 to 4. Epoxy novolac resins are commercially available from Dow Chemical (D.E.N.™ resins), Hexion (Epikote™ resins), Emerald Performance Materials (Epalloy® resins), Georgia-Pacific, and other suppliers. Combinations of different epoxy novolac resins can be used.

Suitable diphenylmethanes include, e.g., diphenylmethane, benzhydrol, 1,1-diphenylethane, 2,2-diphenylpropane, and the like, and mixtures thereof.

Suitable tris(aryloxy)phosphates include triphenyl phosphate, trimesityl phosphate, trixylyl phosphate, tritolyl phosphate, and the like, and mixtures thereof.

The clarifier is used in an amount within the range of 0.1 to 50 wt. % based on the amount of polyester polyol, with the exact amount being within the skilled person's discretion. In other aspects, 0.5 to 40 wt. %, or 1.0 to 30 wt. %, or 2.0 to 15 wt. % of the clarifier is used. In some aspects, 6 to 30 wt. % or 10 to 25 wt. % of the clarifier may be more desirable. Too little clarifier may have a limited impact on the long-term clarity of the polyol, while too much of the clarifier may generate a product with undesirably high viscosity.

In another aspect, the invention relates to a composition comprising an essentially transparent polyester polyol. The polyol comprises recurring units of a terephthalate source, a diol, and a bis- or poly-phenol having two or more phenylene rings, wherein at least two of the phenylene rings lack a common molecular axis.

"Essentially transparent" means that the polyol appears clear or mostly clear after prolonged storage, for instance, seven days, a month, or several months. In some aspects, the polyol has a seven-day % transmittance at 900 nm, as measured herein, of at least 30%, or at least 35% or at least 40%.

Suitable diols have already been described.

"Terephthalate source" means a compound or mixture of compounds having at least one terephthalic acid or terephthalate ester group. Examples include polyethylene terephthalate, terephthalate oligomers from digestion of PET, terephthalic acid, dialkyl terephthalates (e.g., dimethyl terephthalate), DMT bottoms (as described, e.g. in U.S. Pat. Nos. 5,075,417; 4,897,429; 3,647,759; 4,411,949; 4,714,717; and 4,897,429, the teachings of which are incorporated herein by reference), and mixtures thereof. In one aspect, the terephthalate source is selected from polyethylene terephthalate, dimethyl terephthalate, terephthalic acid, and dimethyl terephthalate bottoms.

The polyols comprise units of a bis- or poly-phenol having two or more phenylene rings, wherein at least two of the phenylene rings lack a common molecular axis. A "bis- or polyphenol" has at least two phenolic hydroxyl groups, which may be on the same or different phenylene (benzene) rings, but are preferably on different phenylene rings. At least two of the phenylene rings lack a "common molecular axis." Common examples are bisphenols, such as bisphenol A. In such compounds, the linking group between the phenylene rings prevents the rings from sharing a common molecular axis. In contrast, consider 4,4'-dihydroxybiphenyl. Because the phenylene rings are joined directly together, they share a common molecular axis. Comparative Example 11 (below) illustrates the use of 4,4'-dihydroxybiphenyl and shows that it is an ineffective reactant for improving clarity of the polyester polyol.

Suitable bis- or poly-phenols that meet the requirements of the preceding paragraph include the clarifiers already described above. Additionally, polyphenolic materials such as novolac resins, ethoxylated novolac resins, and the like may be used. In some aspects, the bis- or poly-phenol is selected from bisphenol A, bisphenol F, bisphenol acetophenone, ethoxylated bisphenol A, ethoxylated bisphenol F, 4,4'-sulfonyldiphenol, ethoxylated 4,4'-sulfonyldiphenol, and mixtures thereof. The bis- or poly-phenol is used in an amount within the range of 0.1 to 50 wt. % based on the amount of polyester polyol. In other aspects, 0.5 to 40 wt. %, or 1.0 to 30 wt. %, or 2.0 to 15 wt. % of the bis- or poly-phenol may be used.

In another aspect, the invention relates to a composition comprising an essentially transparent polyester polyol comprising recurring units of a terephthalate source, a diol, and a monophenolic compound having two or more phenylene rings, wherein at least two of the phenylene rings lack a common molecular axis.

Suitable diols and terephthalate sources have already be described.

The monophenolic compound has two or more phenylene rings, wherein at least two of the phenylene rings lack a common molecular axis. "Monophenolic" means that only one phenolic hydroxyl group will be present. Suitable monophenolic compounds that meet the definition above include, for example, monostyryl phenols, distyryl phenols, tristyrylphenol, 4-benzylphenol, 2-benzylphenol, 2,4-dibenzylphenol, 2,4,6-tribenzylphenol, and the like, and mixtures thereof. Monostyryl phenols, distyryl phenols, and tristyrylphenol are preferred; tristyrylphenol is particularly preferred. The monophenolic compound is used in an amount within the range of 0.1 to 50 wt. % based on the amount of polyester polyol. In other aspects, 0.5 to 40 wt. %, or 1.0 to 30 wt. %, or 2.0 to 15 wt. % of the monophenolic compound may be used.

In another aspect, the invention relates to a composition comprising an essentially transparent polyester polyol. The polyol comprises recurring units of a terephthalate source and a diol, which have already been described. The composition further comprises a non-phenolic aromatic compound having two or more phenylene rings, wherein at least two of the phenylene rings lack a common molecular axis.

Suitable non-phenolic aromatic compounds of the type described in the preceding paragraph include, for example, tricresyl phosphate, diphenylmethanol, diphenylmethane, and the like, and mixtures thereof. The nonphenolic aromatic compound is used in an amount within the range of 0.1 to 50 wt. % based on the amount of polyester polyol. In other aspects, 0.5 to 40 wt. %, or 1.0 to 30 wt. %, or 2.0 to 15 wt. % of the nonphenolic aromatic compound may be used.

Methods for Making Polyester Polyols

The invention includes methods for making polyester polyols with improved clarity. One method comprises reacting a thermoplastic polyester, a diol, and optionally a hydrophobe, at a temperature within the range of 80 to 250° C. to produce a digested intermediate. The digested intermediate is then reacted or mixed with 0.1 to 50 wt. % of a clarifier selected from bisphenols, bisphenol alkoxylates, bisphenol polycarbonates, sulfonyl diphenols, and sulfonyl diphenol alkoxylates at a temperature within the range of 20 to 250° C. to produce the polyol. The polyol has a hydroxyl number within the range of 25 to 800 mg KOH/g and a seven-day % transmittance at 900 nm as measured herein of at least 30%.

Suitable thermoplastic polyesters, diols, hydrophobes, and clarifiers have already been described.

When a thermoplastic polyester is used, the digested intermediate can be a mixture of diol reactant, glycol(s) generated from the thermoplastic polyester, terephthalate oligomers, and other glycolysis products. For example, when PET or rPET is the thermoplastic polyester, the digested intermediate can include a mixture of diol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., Ind. Eng. Chem. Res. 36 (1997) 1373 and N. Ikladious, J. Elast. Plast. 32 (2000) 140). Heating is advantageously performed at temperatures within the range of 80° C. to 260° C., preferably 100° C. to 250° C., more preferably 130° C. to 240° C., and most preferably 160° C. to 230° C.

In one aspect, when the thermoplastic polyester is polyethylene terephthalate, the digested intermediate comprises diols and a terephthalate component. The terephthalate component may comprise, by gel permeation chromatography using ultraviolet detection, 45 to 70 wt. % of bis(hydroxyalkyl)terephthalates. In another aspect, the terephthalate component further comprises 20 to 40 wt. % of terephthalate dimers. In another aspect, the terephthalate component of the digested intermediate comprises 45 to 65 wt. % of bis(hydroxyalkyl)terephthalates, 20 to 35 wt. % of terephthalate dimers, and 5 to 15 wt. % of terephthalate trimers. In another aspect, the terephthalate component comprises 50 to 60 wt. % of bis(hydroxyalkyl)terephthalates, 25 to 30 wt. % of terephthalate dimers, and 8 to 12 wt. % of terephthalate trimers.

Catalysts suitable for making the digested intermediate are well known (see, e.g., K. Troev et al., J. Appl. Polym. Sci. 90 (2003) 1148). In particular, suitable catalysts comprise titanium, zinc, antimony, germanium, zirconium, manganese, tin, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, butyl stannoic acid, di-n-butyl-oxo-stannane, di-n-butyltin dilaurate, or the like, and mixtures thereof. Catalysts that do not significantly promote isocyanate reaction chemistries are preferred. Catalysts comprising titanium, particularly titanium alkoxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester, the diol(s), the optional hydrophobe, and any catalyst at least until the mixture liquefies and particles of the thermoplastic polyester are no longer apparent. Reaction times range from about 30 minutes to about 16 hours, more typically 1 to 10 hours, and will depend on the reaction temperature, source and nature of the thermoplastic polyester, the particular diol reactant used, mixing rate, desired degree of depolymerization, and other factors that are within the skilled person's discretion.

In some aspects, the molar ratio of diol to thermoplastic polyester may be at least 0.8, or in some aspects 0.8 to 6.0, or in other aspects 1.5 to 4.5. When the diol to thermoplastic polyester molar ratio is below 0.8, the polyester polyol may be a solid or may be too viscous to be practical for use as a polyol. On the other hand, when the diol/thermoplastic polyester molar ratio is greater than about 6, the hydroxyl number of the polyester polyol may tend to exceed the practical upper limit of about 800 mg KOH/g.

The digested intermediate is reacted or mixed with 0.1 to 50 wt. % of a clarifier selected from bisphenols, bisphenol alkoxylates, bisphenol polycarbonates, sulfonyl diphenols, and sulfonyl diphenol alkoxylates at a temperature within the range of 20 to 250° C. to produce the polyol. The polyol has a hydroxyl number within the range of 25 to 800 mg KOH/g and a seven-day % transmittance at 900 nm as measured herein of at least 30%.

In some aspects, the digested intermediate is reacted with 0.5 to 40 wt. %, or 1.0 to 30 wt. %, or 2.0 to 15 wt. %, of the clarifier.

The reaction between the digested intermediate and the clarifier is preferably performed under conditions effective to promote formation of a homogeneous mixture or a reaction between the digested intermediate and the clarifier. Formation of the homogeneous mixture or reactions between the digested intermediate and the clarifier are preferably performed by mixing and/or heating at temperatures within the range of 20° C. to 260° C., preferably 80° C. to 230° C., more preferably 90° C. to 220° C., and most preferably 100° C. to 210° C.

The polyol may incorporate one or more anhydrides, diesters, or dicarboxylic acids outside the $C_9$-$C_{18}$ range. Suitable dicarboxylic acids include, for example, glutaric acid, adipic acid, succinic acid, cyclohexane dicarboxylic acids, maleic acid, fumaric acid, itaconic acid, phthalic acid, 1,5-furandicarboxylic acid, dimer or trimer fatty acids, isophthalic acid, and anhydrides thereof (e.g., maleic anhydride, phthalic anhydride, itaconic anhydride, and the like). Mixtures of dicarboxylic acids can be used, including, e.g., the commercially available mixture of dibasic acids known as "DBA." A typical DBA composition might contain 51-61 wt. % glutaric acid, 18-28 wt. % succinic acid, and 15-25 wt. % adipic acid.

In another aspect, the polyester polyol is made in a single step by reacting the thermoplastic polyester, the diol, the optional hydrophobe, and the clarifier under conditions effective to produce the polyol. As with polyols made using the two-step method, the amount of clarifier incorporated into the polyol is within the range of 0.1 to 50 wt. %, and the resulting polyol has a hydroxyl number within the range of 25 to 800 mg KOH/g.

In other aspects, the polyester polyol is made in two steps by first reacting a terephthalate source, a diol, and an optional hydrophobe at a temperature within the range of 80 to 250° C. to produce a digested intermediate. The digested intermediate is then reacted or mixed with a bis- or polyphenol having two or more phenylene rings, wherein at least two of the phenylene rings lack a common molecular axis, at a temperature within the range of 20 to 250° C. to produce the polyester polyol. In some aspects, the resulting polyester polyol has a seven-day % transmittance at 900 nm as measured herein of at least 30%. The polyester polyol can be made in a single step by reacting the terephthalate source, the diol, the optional hydrophobe, and the bis- or polyphenol under conditions effective to produce the polyol.

In other aspects, the polyester polyol is made in two steps by first reacting a terephthalate source, a diol, and an optional hydrophobe at a temperature within the range of 80 to 250° C. to produce a digested intermediate. The digested intermediate is then reacted or mixed with a monophenolic compound having two or more phenylene rings, wherein at least two of the phenylene rings lack a common molecular axis, at a temperature within the range of 20 to 250° C. to produce the polyester polyol. In some aspects, the resulting polyester polyol has a seven-day % transmittance at 900 nm as measured herein of at least 30%. The polyester polyol can be made in a single step by reacting the terephthalate source, the diol, the optional hydrophobe, and the monophenolic compound under conditions effective to produce the polyol.

In other aspects, the polyester polyol is made in two steps by first reacting a terephthalate source, a diol, and an optional hydrophobe at a temperature within the range of 80 to 250° C. to produce a digested intermediate. The digested intermediate is then combined with a non-phenolic aromatic compound having two or more phenylene rings, wherein at least two of the phenylene rings lack a common molecular axis to produce the polyester polyol. In some aspects, the resulting polyester polyol has a seven-day % transmittance at 900 nm as measured herein of at least 30%. The polyester polyol can be made in a single step by reacting the terephthalate source, the diol, and the optional hydrophobe in the presence of the non-phenolic aromatic compound under conditions effective to produce the polyol.

Polyol Attributes

The inventive polyester polyols have hydroxyl numbers within the range of 25 to 800 mg KOH/g, preferably 35 to 500 mg KOH/g, and more preferably 40 to 400 mg KOH/g. Hydroxyl number can be measured by any accepted method for such a determination, including, e.g., ASTM E-222 ("Standard Test Methods for Hydroxyl Groups Using Acetic Anhydride Acetylation").

The inventive polyester polyols have improved storage stability, i.e., transparency or clarity over at least seven days, when compared with similar polyester polyols produced in the absence of a clarifier. In particular, the polyols have a seven-day % transmittance at 900 nm, as measured herein, of at least 30%. In some aspects, the polyols have a seven-day % transmittance at 900 nm, as measured herein, of at least 35% or at least 40%. In some aspects, the polyols have a thirty-day % transmittance at 900 nm, as measured herein, of at least 30%, at least 35%, or at least 40%.

Any suitable means for measuring light transmittance can be used. In the present method, polyol samples can be liquefied and transferred to cuvettes. We found it convenient to use quartz cuvettes having a 10-mm path. The samples are tested under the same conditions as a reference sample that contains distilled water. Any spectrophotometer capable of measuring % transmittance at 900 nm can be used. For example, a Pharmacia LKB Ultrospec III UV/visible spectrophotometer (model #80209762) is well-suited for use. By recording % transmittance of samples over multiple days, and particularly after 7 days, a suitable data set can be generated (see, e.g., Table 1).

We surprisingly found that incorporation of certain compounds (e.g., bisphenols or sulfonyl diphenols) into polyester polyols produced from digested thermoplastic polyesters, especially recycled PET, helps the resulting polyester polyol maintain its clarity for weeks or even months. We observed the clarifying effect with even a small proportion of a clarifier (e.g., 0.5 wt. %), although for long-term clarity, a greater amount of clarifier (e.g., 6 to 25 or 10 to 20 wt. %) might be more desirable. Moreover, large amounts of clarifier (up to 50 wt. %) can often be tolerated if desired. As illustrated in the examples below, the effect may be linked to clarifiers that, at least in some cases, have two or more phenylene rings that lack a common molecular axis. Bisphenols and sulfonyl diphenols share this attribute. Compounds in which phenylene rings share a common molecular axis, such as 4,4'-dihydroxybiphenyl, appear to be less effective in imparting long-term clarity to the polyols.

In some aspects, the inventive polyols may have average hydroxyl functionalities (i.e., the average number of —OH groups per molecule) within the range of 1.8 to 2.7, preferably 2.0 to 2.5, more preferably 2.0 to 2.2.

In some aspects, the inventive polyols are flowable liquids under ambient conditions. Preferably, the polyols have viscosities measured at 75° C. less than 30,000 cP, more preferably less than 20,000 cP, most preferably less than 10,000 cP. A preferred range for the polyol viscosity is 300 to 10,000 cP at 75° C., more preferably 500 to 3,000 cP. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The polyols preferably have low acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably less than 10 mg KOH/g, and most preferably less than 5 mg KOH/g. Acid numbers can be adjusted if necessary for a particular application with an acid scavenger such as, for example, an epoxide derivative, and this treatment can be performed by the manufacturer, distributor, or end user.

An advantage of the polyester polyols is their reduced reliance on petrochemical sources for raw material. Preferably, the polyols include greater than 10 wt. %, more preferably greater than 25 wt. %, most preferably greater than 40 wt. % of recycle content. A preferred range for the recycle content is 25 to 100 wt. %. By "recycle content," we mean the combined amounts of post-consumer and post-industrial recycled materials as a percentage of all of the reactants used. Recycled thermoplastic polyester (e.g., rPET) and recycled glycols are included in this amount. Propylene glycol, ethylene glycol, and diethylene glycol are available as recovered or recycled materials. For instance, propylene glycol is used in deicing fluids, and after use, it can be recovered, purified, and reused. Certain hydrophobes, such as recycled cooking oil, may also be a source of the recycle content.

In some aspects, the polyols will also have bio-renewable content. By "bio-renewable content," we mean the proportion of readily renewable materials from biological sources compared with the total mass of the reactants. Bio-renewable materials include, for example, plant-derived natural oils and the fatty acid components of the oils. Most of the optional hydrophobes described herein are "bio-renewable." In some aspects, the polyester polyols will have bio-renewable contents greater than 10 wt. %, preferably greater than 25 wt. %, more preferably greater than 40 wt. %.

In some aspects, the polyols will have substantial "green content." By "green content," we mean the sum of the recycle and bio-renewable contents. In some aspects, the polyester polyols will have green contents greater than 20 wt. %, preferably greater than 50 wt. %, more preferably greater than 80 wt. %, and most preferably greater than 90 wt. %.

Although performance in the ultimate end use is paramount, urethane manufacturers like to purchase polyols that have an appearance of quality. When other considerations are equal, a transparent (or nearly transparent) polyol may appear to be of higher quality and easier to process than an opaque one. Unlike known polyols that are made by reacting thermoplastic polyester digestion products with dicarboxylic acids such as succinic acid or phthalic anhydride, which are often opaque, the inventive polyols are frequently transparent or nearly so, and they can retain their clarity for weeks or months.

Products from the Polyester Polyols

The inventive polyester polyols can be used to formulate a wide variety of polyurethane products. By adjusting the proportion of any optional hydrophobe, a desired degree of polyol hydrophobicity can be "dialed in." The ability to control hydrophobicity is particularly valuable in the coatings industry. The polyols can be used alone or in combination with other polyols to produce cellular, microcellular, and non-cellular materials including flexible foams, rigid foams (including polyisocyanurate foams), polyurethane dispersions, coatings (including one- or two-component polyurethanes), adhesives, sealants, and elastomers. The resulting polyurethanes are potentially useful for automotive and transportation applications, building and construction products, marine products, packaging foam, flexible slabstock foam, carpet backing, appliance insulation, cast elastomers and moldings, footwear, biomedical devices, and other applications.

Curable Coatings

Further, the inventive polyester polyols may be derivatized to form mono-, di- and polyacrylates via esterification or transesterification with acrylic acid or methacrylic acid-derived raw materials. Thus, in one aspect, the invention relates to a curable resin comprising a reaction product of an acrylate or methacrylate source and an inventive polyol. Examples of (meth)acrylation raw materials suitable for forming (meth)acrylate derivatives of the inventive polyester polyols include acryloyl chloride, methacryloyl chloride, methacrylic acid, acrylic acid, methyl acrylate, methyl methacrylate, and the like, or mixtures thereof. Such (meth)acrylate-derivatized inventive polyester polyols are useful for radiation or UV-cure coating formulations or applications. Prepolymers of the inventive polyester polyols may be derivatized to form urethane (meth)acrylates via reaction with hydroxyethyl (meth)acrylate. The resulting urethane acrylates may also be used in radiation or UV-cure coating formulations or applications.

Polyurethane Dispersions

In a particular aspect, the invention relates to aqueous polyurethane dispersions made from the inventive polyester polyols. The polyols are readily formulated into aqueous polyurethane dispersions having a desirable balance of properties, including high solids, low viscosities, and a low tendency to settle. Numerous ways to formulate aqueous polyurethane dispersions are known and suitable for use. Preferably, the polyurethane dispersion is made by emulsifying an isocyanate-terminated prepolymer in water with the aid of an emulsifying agent. Water, a water-soluble polyamine chain extender, or a combination thereof may be used to react with the emulsified prepolymer. The prepolymer is preferably made by reacting an inventive polyester polyol, a hydroxy-functional emulsifier, one or more auxiliary polyols, and one or more polyisocyanates. The aqueous polyurethane dispersions are preferably used to formulate water-borne coatings, adhesives, sealants, elastomers, and similar urethane products, and they are particularly valuable for reducing reliance on solvents. For instance, the dispersions can be used to formulate low- or zero-VOC compositions.

Polyisocyanates suitable for use in making the prepolymers are well known; they include aromatic, aliphatic, and cycloaliphatic polyisocyanates. Examples include toluene diisocyanates (TDIs), MDIs, polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Aliphatic diisocyanates, such as hexamethylene diisocyanate and isophorone diisocyanates are particularly preferred.

Auxiliary polyols suitable for use are also well known. They include polyether polyols, aliphatic polyester polyols, aromatic polyester polyols, polycarbonate polyols, glycols, and the like. Preferred auxiliary polyols have average hydroxyl functionalities within the range of 2 to 6, preferably 2 to 3, and number average molecular weights within the range of 500 to 10,000, preferably 1,000 to 8,000. Preferred polyester polyols are condensation products of dicarboxylic acids and diols or triols (e.g., ethylene glycol, propylene glycol, 2-methyl-1,3-propanediol, 3-methyl-1,5-pentanediol, 1,4-butanediol, neopentyl glycol, glycerin, trimethylolpropane, 1,4-cyclohexanedimethanol, bisphenol A ethoxylates), especially diols. The dicarboxylic acids can be aliphatic (e.g., glutaric, adipic, succinic) or aromatic (e.g., phthalic), preferably aliphatic.

A hydroxy-functional emulsifier is also used to make the polyurethane dispersions. The role of this component is to impart water-dispersibility to the prepolymer, usually upon its combination with water and a neutralizing agent, such as an acid or base reactant. Thus, in one aspect, the hydroxy-functional emulsifier is an acid-functional diol such as dimethylolpropionic acid (DMPA) or dimethylolbutanoic acid (DMBA). The acid functionality in the resulting prepolymer allows for neutralization with an amine or other basic reactant to generate a water-dispersible urethane. The hydroxy-functional emulsifier can also be an amine, such as N-methyldiethanolamine. Neutralization of the resulting prepolymer with an acidic reagent renders it water dispersible. In other aspects, the hydroxy-functional emulsifier is nonionic, e.g., a polyethylene glycol monomethyl ether. In another aspect, the hydroxy-functional emulsifier may be a monol- or diol-functionalized poly(ethylene oxide), such as for example Ymer™ N120 dispersing monomer (product of Perstorp). Additionally, non-reactive, so-called "external emulsifiers," such as the triethanolamine salt of dodecylbenzene sulfonic acid, may be included in the aqueous phase to assist in the emulsification and stabilization of the prepolymer and resulting polyurethane dispersion.

In certain aspects, a chain terminator may be used to control the molecular weight of polyurethane polymer contained within the aqueous polyurethane dispersion. Monofunctional compounds, such as those containing hydroxyl, amino, and thio groups that have a single active hydrogen-containing group, are suitable chain terminators. Examples include alcohols, amines, thiols, and the like, especially primary and secondary aliphatic amines.

Chain extenders can also be included in making the polyurethane dispersion. In some aspects, the chain extender is added in an amount sufficient to react 5 to 105 mole % of free NCO groups present. Suitable chain extenders contain at least two functional groups that are capable of reacting with isocyanates, e.g., hydroxyl, thio, or amino groups in any combination. Suitable chain extenders include, for example, diols (ethylene glycol, propylene glycol, diethylene glycol, neopentyl glycol, 1,4-butanediol, 2-methyl-1,3-propanediol, 3-methyl-1,5-pentanediol, 1,4-cyclohexanedi-methanol, and the like), di- and polyamines (ethylenediamine, diethylenetriamine, Jeffamine® T-403, Jeffamine® D-230, Jeffamine® ED-2001, Jeffamine® ED-600, Jeffamine® ED-900, 1,6-hexamethylenediamine, butylenediamine, hydrazine, piperazine, N-hydroxyethyl ethylenediamine) alkanolamines (ethanolamine, diethanolamine, N-methyl diethanolamine, and the like), dithiols, and the like. Diol chain extenders are preferably added during the preparation of the prepolymer, and prior to emulsification in water, while amine chain extenders are preferably added after emulsification in water.

In a typical example, the polyester polyol, an acid-functional diol (DMPA), and auxiliary polyols (polyethylene glycol 200 and a polyester polyol made from 3-methyl-1,5-pentanediol and adipic acid) are combined and reacted with a mixture of aliphatic diisocyanates (hexamethylene diisocyanate and isophorone diisocyanate) in the presence of a tin catalyst (dibutyltin dilaurate) or a bismuth catalyst (such as bismuth dioctanoate) and a solvent (acetone). The resulting prepolymer is then dispersed in a mixture of water, triethanolamine (neutralizing agent), and a silicone defoamer. The expected product is an aqueous polyurethane dispersion having high solids content, low viscosity, and desirable settling properties.

For more examples of suitable approaches for preparing aqueous polyurethane dispersions, see U.S. Pat. Nos. 5,155,163; 5,608,000; 5,763,526; 6,339,125; 6,635,723, 7,045,573; and 7,342,068, the teachings of which are incorporated herein by reference.

The following examples merely illustrate the invention; the skilled person will recognize many variations that are within the spirit of the invention and scope of the claims.

"Recycle content" is the proportion of post-consumer and post-industrial recycled materials compared with the mass of all reactants. Materials having recycle content in the examples: recycled PET, propylene glycol.

"Bio-renewable content" is the proportion of readily renewable materials from biological sources compared with the mass of all reactants. Materials having bio-renewable content in the examples: dimer fatty acid.

"Green content" is the sum of the recycle and bio-renewable contents.

Hydroxyl numbers and acid numbers are determined by standard methods (ASTM E-222 and ASTM D3339, respectively). Hydroxyl value (OHV)=hydroxyl number minus acid number.

Viscosities are measured at 25° C. using a Brookfield DV-III Ultra rheometer with spindle #31 at 25%, 50%, and 75% torque.

Preparation of a Dimer Fatty Acid-Modified Polyol ("Control 1")

A 5-L reactor equipped with an overhead mixer, condenser, heating mantle, thermocouple, and nitrogen inlet is charged with titanium tetrabutoxide (0.1 wt. %), recycled polyethylene terephthalate (PET) pellets or flakes (960 g, 5.0 mol), and recycled propylene glycol (1065.2 g, 14.0 mol). The mixture is heated with stirring to about 130° C. Stirring and heating continue until the reactor contents reach 200° C. The mixture is heated until no particles of recycled PET remain (about 4 h). When the digestion reaction is considered complete, the mixture is cooled to about 100° C. Dimer fatty acid (Pripol™ 1017, 1311.7 g, 2.3 mol, product of Croda) is added, while the mixing rate is increased to 200 rpm. When the addition is complete, a Dean-Stark trap is introduced, and the mixture is then heated to 170° C. The temperature is slowly increased to 185° C. Water is removed until roughly the theoretical amount is collected. When the reaction is complete, the digested intermediate is allowed to cool to 100° C. and is then decanted from the reactor. Any residual solids are removed by filtration through cheesecloth. The resulting amber intermediate is initially transparent but becomes opaque within a week (7-day transmittance at 900 nm=26.0%). Hydroxyl value (OHV): 384 mg KOH/g; viscosity (25° C.): 3326 cP.

Example 1

Reaction of Dimer Fatty Acid-Modified Polyester Polyol with Bisphenol A

A 500-mL reactor equipped with an overhead mixer, Vigreux column, short-path condenser head with distillation collection flask, heating mantle, thermocouple, and nitrogen inlet is charged with bisphenol A (34.5 g, 10.3 wt. % in the polyol) and 300.3 g of the dimer fatty acid-modified polyester polyol ("Control 1") described above. The mixture is heated with stirring to 210° C. for 4.0 h. After about 0.5 h, the bisphenol A has completely dissolved. When the reaction is complete, the product is allowed to cool to 100° C. and is then decanted from the reactor. Any residual solids are removed by filtration through cheesecloth. The resulting amber polyol is transparent and remains so after a week (7-day transmittance at 900 nm=42.8%). OHV=381 mg KOH/g; viscosity (25° C.): 6817 cP. The polyol remains clear after one month (30-day transmittance at 900 nm=42%).

Example 2

The procedure of Example 1 is followed using 5.07 wt. % of bisphenol A. The resulting polyol remains transparent after a week (7-day transmittance at 900 nm=42.8%) and gradually loses its transparency thereafter. OHV=375 mg KOH/g; viscosity (25° C.): 5335 cP.

Example 3

The procedure of Example 1 is followed using 3.26 wt. % of bisphenol A. The resulting polyol remains transparent after a week (7-day transmittance at 900 nm=43.3%) and gradually loses its transparency thereafter. OHV=368 mg KOH/g; viscosity (25° C.): 4752 cP.

Example 4

The procedure of Example 1 is followed using 1.32 wt. % of bisphenol A. The resulting polyol is mostly transparent after a week (7-day transmittance at 900 nm=31.1%) and gradually loses its transparency thereafter. OHV=367 mg KOH/g; viscosity (25° C.): 4132 cP.

Comparative Example 5

The procedure of Example 1 is followed using 0.50 wt. % of bisphenol A. The resulting polyol is opaque after a week (7-day transmittance at 900 nm=9.5%). OHV=382 mg KOH/g; viscosity (25° C.): 3830 cP.

Example 6

The procedure of Example 1 is followed using 46.7 wt. % of bisphenol A. The resulting polyol remains transparent after a week (7-day transmittance at 900 nm=42.8%). OHV=464 mg KOH/g; viscosity (25° C.): 360,000 cP.

Example 7

The procedure of Example 1 is followed using 10.8 wt. % of bisphenol acetophenone. The resulting polyol remains transparent after a week (7-day transmittance at 900 nm=43.2%). OHV=383 mg KOH/g; viscosity (25° C.): 9560 cP. The polyol remains clear after one month (30-day transmittance at 900 nm=42%).

Example 8

The procedure of Example 1 is followed using 10.2 wt. % of bisphenol F. The resulting polyol remains transparent after a week (7-day transmittance at 900 nm=41.2%). OHV=386 mg KOH/g; viscosity (25° C.): 7468 cP. The polyol remains clear after one month (30-day transmittance at 900 nm=41%).

Example 9

The procedure of Example 1 is followed using 10.5 wt. % of 4,4'sulfonyldiphenol. The resulting polyol remains transparent after a week (7-day transmittance at 900 nm=42.9%). OHV=347 mg KOH/g; viscosity (25° C.): 12,872 cP. The polyol remains clear after one month (30-day transmittance at 900 nm=42%).

Example 10

The procedure of Example 1 is followed using 10.8 wt. % of bis[4-(2-hydroxyethyl)phenyl]sulfone. The resulting polyol is transparent after a week (7-day transmittance at 900 nm=39.8%) and gradually loses its transparency thereafter. OHV=380 mg KOH/g; viscosity (25° C.): 7909 cP.

Comparative Example 11

The procedure of Example 1 is followed using 10.7 wt. % of 4,4'dihydroxybiphenyl. The resulting polyol is initially opaque and remains so after a week (7-day transmittance at 900 nm=0.4%). OHV=389 mg KOH/g.

Comparative Example 12

The procedure of Example 1 is followed using 12.2 wt. % of hydrogenated bisphenol A. The resulting polyol is initially transparent but quickly becomes opaque (7-day transmittance at 900 nm=2.3%). OHV=375 mg KOH/g; viscosity (25° C.): 7633 cP.

Preparation of a Digested Intermediate from PET and PEG 200 ("Control 2")

A 2-L reactor equipped with an overhead mixer, condenser, heating mantle, thermocouple, and nitrogen inlet is charged with titanium tetrabutoxide (0.05 wt. %), recycled PET pellets or flakes (340.0 g, 34.0 wt. %), and bio-based polyethylene glycol 200 (660.0 g, 66.0 wt. %). The mixture is heated with stirring to about 130° C. Heating continues until the reactor contents reach 210° C. The mixture is heated until no particles of recycled PET remain (about 5 h). When the reaction is considered complete (about 6 h), the mixture is cooled to about 100° C. The digested intermediate is allowed to cool to 100° C. and is then decanted and filtered as usual. The resulting opaque brown-amber product is initially transparent but quickly becomes opaque and remains so after a week (7-day transmittance at 900 nm=11.4%). OHV=352 mg KOH/g; viscosity (25° C.): 640 cP.

Example 13

Preparation of a Bisphenol A-Modified Polyol

A 500-mL reactor equipped with an overhead mixer, Vigreux column, short-path condenser head with distillation collection flask, heating mantle, thermocouple, and nitrogen inlet is charged with bisphenol A (25.4 g, 11.5 wt. % in the polyol) and 195.5 g of the digested intermediate from PET and PEG 200 ("Control 2") described above. The mixture is heated with stirring to 210° C. for 4.0 h. After about 0.5 h, the bisphenol A has completely dissolved. When the reaction is complete, the product is allowed to cool to 100° C. and is then decanted and filtered. The resulting polyol remains transparent after a week (7-day transmittance at 900 nm=42.6%). OHV=376 mg KOH/g; viscosity (25° C.): 1237 cP.

Example 14

The procedure of Example 13 is followed using 45.5 wt. % of bisphenol A in the polyol. The resulting polyol remains transparent after a week (7-day transmittance at 900 nm=44.1%). OHV=424 mg KOH/g; viscosity (25° C.): 29,464 cP.

Example 15

The procedure of Example 13 is followed using 10.1 wt. % of bisphenol A (3 EO) ethoxylate in the polyol. The resulting polyol remains transparent after a week (7-day transmittance at 900 nm=55.5%). OHV=338 mg KOH/g; viscosity (25° C.): 760 cP. The polyol remains clear after one month and improves the overall light transmission qualities of the product (30-day transmittance at 900 nm=57%).

Preparation of a Digested Intermediate ("Control 3")

The procedure of Example 3 is followed except that 320.0 g of recycled PET pellets or flakes (32.0 wt. %) and 680.0 g (68.0 wt. %) of bio-based polyethylene glycol 200 are used. (660.0 g, 66.0 wt. %). The resulting golden-amber product is opaque (7-day transmittance at 900 nm=20.4%). OHV=387.3 mg KOH/g; viscosity (25° C.): 479 cP.

Comparative Example 17

Preparation of Polyester Polyol: High Wt. % of Recycled PET

A 500-mL reactor equipped with an overhead mixer, Vigreux column, short-path condenser head with distillation collection flask, heating mantle, thermocouple, and nitrogen inlet is charged with bisphenol A (30.0 g, 10.0 wt. % in the polyol), 135.00 g of recycled PET pellets (135 g, 45 wt. %), recycled propylene glycol (11.7 g, 3.9 wt. %), bio-based polyethylene glycol 200 (123 g, 41 wt. %), and titanium tetrabutoxide (0.1 wt. %). The mixture is heated with stirring to 210° C. for 8.0 h. After about 1 h, the mixture reaches 210° C., and the stirring rate is increased to 200 rpm. The mixture Is heated until no particles of recycled PET remain (about 4 h). When the reaction is complete, the product is allowed to cool to 100° C. and is then decanted and filtered. The resulting grey-green polyol is opaque (7-day transmittance at 900 nm=0.2%). OHV=311 mg KOH/g; viscosity (25° C.): 8733 cP.

Comparative Example 18

Preparation of Polyester Polyol: High Wt. % of Recycled PET

The procedure of Comparative Example 17 is generally followed except that the reactants are ethoxylated bisphenol A (50 wt. %), recycled PET pellets (49.9 wt. %), and titanium tetrabutoxide (0.1 wt. %). The mixture is heated with stirring to 210° C. for 9.0 h. After the 9-h heating period, the temperature is increased to 220° C. because some PET particles remain. After 24 h of reaction time, the product is allowed to cool to 100° C. and is decanted and filtered as usual. The resulting highly viscous, grey-green polyol is immediately opaque and remains so for a week (7-day transmittance at 900 nm not measured). OHV=74.3 mg KOH/g.

Comparative Example 19

Preparation of Polyester Polyol: Bisphenol A as an Additive

A 500-mL reactor equipped with an overhead mixer, Vigreux column, short-path condenser head with distillation collection flask, heating mantle, thermocouple, and nitrogen inlet is charged with bisphenol A (5.06 wt. % in the polyol) and 300.2 g of the dimer fatty acid-modified polyester polyol ("Control 1") described above. The mixture is heated with stirring to 100° C. for 4.0 h. After about 0.5 h, the bisphenol A has completely dissolved. After 4 h, the product is allowed to cool to 100° C. and is then decanted and filtered. The resulting amber polyol is transparent initially transparent, but it becomes mostly opaque within a week (7-day transmittance at 900 nm=25.0%). OHV=391 mg KOH/g; viscosity (25° C.): 4668 cP.

Light Transmittance Measurement

Polyol samples are placed in a 120° C. oven for 1.0 h. Thereafter, samples are transferred to quartz cuvettes (10-mm path) and filled to the top. When all of the cuvettes are full, the samples are covered and placed in the oven at 120° C. for 20 minutes to eliminate any suspended air bubbles. The samples are allowed to cool at room temperature for 1.0 h prior to measurement.

All samples are measured for % transmittance at 900 nm using a Pharmacia LKB Ultrospec III UV/visible spectrophotometer (model #80209762). The reference sample is a quartz cuvette filled with distilled water. After the reference point is set, each sample is placed in the cell holder and the % transmittance is recorded. The procedure is repeated 24 hours, 7 days, and 30 days from initial transmittance testing. Results appear in Table 1.

Results:

Table 1 summarizes results of the light transmittance experiments.

As shown in Control 1, when a clarifier is omitted, a polyester polyol made from recycled PET, propylene glycol, and dimer fatty acid is initially transparent, but it becomes opaque within one week.

Examples 1-4 and 6 show that reaction of this DFA-modified polyester polyol with 1.3 to 46 wt. % of bisphenol A improves the seven-day % transmittance of the product. The 30-day % transmittance is excellent with about 10 wt. % bisphenol A but is not as good at 5 wt. % or less of the clarifier.

Comparative Example 5 shows that too little of the clarifier may have a limited benefit in achieving good 7-day % transmittance results.

Examples 7-10 show that clarifiers other than bisphenol A can be used, including bisphenol AP, bisphenol F, 4,4'-sulfonyldiphenol, and bis[4-(2-hydroxyethyl)phenyl]-sulfone. Except for bis[4-(2-hydroxyethyl)phenyl]sulfone, all of these clarifiers also exhibit excellent 30-day % transmittance values.

Comparative Examples 11 and 12 illustrate that 4,4'-dihydroxybiphenyl and hydrogenated bisphenol A are ineffective as clarifiers.

Controls 2 and 3 are made by reacting recycled PET with different proportions of polyethylene glycol (PEG 200). These controls are opaque within one week of preparation.

Examples 15 and 16 show that alkoxylated bisphenols and bisphenol polycarbonates can be used as clarifiers. Bisphenol A ethoxylate shows excellent 30-day % transmittance, and provides an overall enhancement in light transmittance when compared with other clarifiers.

Examples 6 and 14 show that a relatively large amount of clarifier can give a transparent product, although it may have high viscosity.

Comparative Examples 17 and 18 show that too high a proportion of the thermoplastic polyester may prevent clarity from being achieved.

Comparative Example 19 shows that including bisphenol A as an additive (at 100° C.) rather than as a reactant (at 210° C.) is less effective in generating a polyester polyol with long-term clarity.

Examples 20-30 and Comparative Example 31

Polyol Clarification Using Other Aromatic Clarifiers

The procedure of Example 1 is generally followed using about 5 wt. % of a variety of other potential clarifiers.

After preparation, polyol samples are placed in a 120° C. oven for 1.0 h. Thereafter, samples are transferred to quartz cuvettes (10-mm path) and filled to the top. When all of the cuvettes are full, the samples are covered and placed in the oven at 120° C. for 20 minutes to eliminate any suspended air bubbles. The samples are allowed to cool at room temperature prior to a first visual evaluation. In each case, the visual appearance of the samples is evaluated at 1 hour, 24 hours, 7 days, 14 days, and 30 days after preparation. Samples able to maintain transparency for 7 days are considered better than the control, which includes no clarifier. The estimated % transmittance for the "opaque" samples is <30%. Results appear in Table 2.

TABLE 1

Polyester Polyols with Enhanced Clarity

| Polyol | Clarifier | PET, wt. % | Clarifier, wt. % | OHV, mg KOH/g | Visc., Cp, 25° C. | Gardner color | Appearance, 7 day | % Transmittance, 900 nm | | | |
|---|---|---|---|---|---|---|---|---|---|---|---|
| | | | | | | | | 1 h | 24 h | 7 day | 30 day |
| Control 1 | none | 28.7 | 0 | 384 | 3326 | 10 | opaque | 42.8 | 43.6 | 26.0 | 6.0 |
| 1 | bisphenol A | 25.7 | 10.3 | 381 | 6817 | 10 | transparent | 40.3 | 41.0 | 42.8 | 42.0 |
| 2 | bisphenol A | 27.2 | 5.07 | 375 | 5335 | 9 | transparent | 41.2 | 41.6 | 42.8 | 3.0 |
| 3 | bisphenol A | 27.8 | 3.26 | 368 | 4752 | 9 | transparent | 41.1 | 41.6 | 43.3 | 8.0 |
| 4 | bisphenol A | 28.3 | 1.32 | 367 | 4132 | 9 | transparent | 42.2 | 42.7 | 31.1 | 2.0 |
| C5 | bisphenol A | 28.6 | 0.50 | 382 | 3830 | 9 | opaque | 41.5 | 41.9 | 9.5 | — |
| 6 | bisphenol A | 15.3 | 46.7 | 464 | 360,000 | — | transparent | 39.5 | 40.7 | 42.8 | — |
| 7 | bisphenol acetophenone | 25.6 | 10.8 | 383 | 9560 | 10 | transparent | 40.7 | 41.2 | 43.2 | 42.0 |
| 8 | bisphenol F | 25.8 | 10.2 | 386 | 7468 | 10 | transparent | 38.6 | 39.0 | 41.2 | 41.0 |
| 9 | 4,4'-sulfonyldiphenol | 25.7 | 10.5 | 347 | 12,872 | 10 | transparent | 40.0 | 40.8 | 42.9 | 42.0 |
| 10 | bis[4-(2-hydroxyethyl)-phenyl]sulfone | 25.6 | 10.8 | 380 | 7909 | 10 | transparent | 45.0 | 45.4 | 39.8 | 15.0 |
| C11* | 4,4'-dihydroxybiphenyl | 25.6 | 10.7 | 389 | — | — | opaque | 0.3 | 0.2 | 0.4 | — |
| C12* | hydrogenated bisphenol A | 25.2 | 12.2 | 375 | 7633 | 10 | opaque | 42.3 | 20.3 | 2.3 | — |
| Control 2 | none | 34.0 | 0 | 352 | 640 | 8 | opaque | 68.3 | 14.3 | 11.4 | — |
| 13 | bisphenol A | 25.4 | 11.5 | 376 | 1237 | 12 | transparent | 39.8 | 40.4 | 42.6 | — |
| 14 | bisphenol A | 15.6 | 45.5 | 424 | 29,464 | 10 | transparent | 41.2 | 41.8 | 44.1 | — |
| 15 | bisphenol A ethoxylate | 25.8 | 10.1 | 338 | 760 | 11 | transparent | 53.6 | 53.7 | 55.5 | 57.0 |
| Control 3 | none | 32.0 | 0 | 387 | 479 | 6 | opaque | 63.9 | 63.7 | 20.4 | — |
| 16 | bisphenol A polycarbonate | 25.7 | 10.4 | 285 | 1252 | 10 | transparent | 40.1 | 40.2 | 42.5 | — |
| C17* | bisphenol A | 45.0 | 10.0 | 311 | 8733 | — | opaque | 0.3 | 0.3 | 0.2 | — |
| C18* | ethoxylated bisphenol A | 49.9 | 50.0 | 74.3 | — | — | opaque | NM | NM | NM | — |
| C19* | bisphenol A (additive) | 27.2 | 5.0 | 391 | 4668 | 10 | opaque | 39.0 | 39.6 | 25.0 | — |

Control 1: Digested polyol from 29% rPET, 32% PG, and 39% dimer fatty acid, catalyzed with 0.1% Ti(OBu)$_4$.
Control 2: Digested polyol from 34% rPET and 66% PEG 200.
Control 3: Digested polyol from 32% rPET and 68% PEG 200.
C17: Bisphenol A (10%), PEG 200 (41%), PG (3.9%), rPET (45%) and 0.1% Ti(OBu)$_4$ charged at the outset and heated to 210° C.
C18: Ethoxylated bisphenol A (50%), rPET (49.9%), and 0.1% Ti(OBu)$_4$ charged at the outset and heated to 210° C., then 220° C.
*Comparative example.
OHV = hydroxyl value.

TABLE 2

Polyester Polyols with Enhanced Clarity

| Polyol | Clarifier | PET, wt. % | Clarifier, wt. % | Appearance | | | | |
|---|---|---|---|---|---|---|---|---|
| | | | | 1 hour | 24 hours | 7 days | 14 days | 30 days |
| Control 1 | none | 28.7 | 0 | transparent | transparent | opaque | opaque | opaque |
| 20 | butylated hydroxytoluene (BHT) | 27.2 | 5.2 | transparent | transparent | transparent | transparent | opaque |
| 21 | diphenylmethane | 27.3 | 5.0 | transparent | transparent | transparent | opaque | opaque |
| 22 | m-cresol | 27.3 | 5.0 | transparent | transparent | transparent | transparent | opaque |
| 23 | benzhydrol | 27.3 | 5.0 | transparent | transparent | transparent | transparent | opaque |
| 24 | p-nonylphenol | 27.3 | 5.0 | transparent | transparent | transparent | transparent | opaque |
| 25 | tritoyl phosphate | 27.3 | 5.0 | transparent | transparent | transparent | opaque | opaque |
| 26 | 4-phenylphenol | 27.3 | 5.0 | transparent | transparent | transparent | transparent | transparent |
| 27 | Kumanox ™ 3111 styrenated phenol[1] | 27.3 | 5.0 | transparent | transparent | transparent | transparent | opaque |
| 28 | Emulsogen ® TS 540 (tristyrylphenol PEG ether)[2] | 27.3 | 5.0 | transparent | transparent | transparent | opaque | opaque |
| 29 | D.E.R. 354 epoxy resin[3] | 27.3 | 5.0 | transparent | transparent | transparent | transparent | transparent |
| 30 | D.E.R. 431 novolac resin[3] | 27.3 | 5.0 | transparent | transparent | transparent | transparent | transparent |
| C31 | polystyrene | 27.3 | 5.0 | opaque | opaque | opaque | opaque | opaque |

"Opaque": estimated transmittance (900 nm) < 30%; "transparent": estimated transmittance (900 nm) > 30%.
[1]Product of Kumho Petrochemical;
[2]Product of Clariant;
[3]Product of Dow Chemical.

As shown in Table 2, a variety of classes of aromatic compositions are able to improve the clarity of the PET-based polyester polyol. Among these classes are alkylated phenols (BHT, m-cresol, p-nonylphenol, 4-phenylphenol, styrenated phenols, and styrenated phenol alkoxylates), epoxy resins, epoxy novolac resins, diphenylmethanes, and tris(aryloxy)phosphates.

Notably, only 5 wt. % of the additive is used in each case in Table 2. As was demonstrated in Table 1 with bisphenol A, 30-day transparency could be achieved at 10 wt. % additive, whereas only 7-day transparency could be reached at 5 wt. % additive. Similar results may be attainable at 10 wt. % for the additives listed in Table 2. Despite its structural similarity to several of the clarifiers, polystyrene (Comparative Example 31) fails to behave as a clarifier at 5 wt. % for even the 1-hour sample and is much poorer than the control.

The preceding examples are meant only as illustrations; the following claims define the inventive subject matter.

We claim:

1. A polyester polyol comprising recurring units from:
   (a) a digested thermoplastic polyester;
   (b) a diol selected from the group consisting of ethylene glycol, propylene glycol, 1,3-propanediol, 1,2-butylene glycol, 1,3-butylene glycol, 1,4-butanediol, 2,2,4,4-tetramethyl-1,3-cyclobutanediol, 2-methyl-1,3-propanediol, 1,6-hexanediol, pentaerythritol, sorbitol, neopentyl glycol, glycerol, trimethylolpropane, 3-methyl-1,5-pentanediol, 1,4-cyclohexanedimethanol, 1,3-cyclohexanedimethanol, diethylene glycol, tetraethylene glycol, dipropylene glycol, triethylene glycol, tripropylene glycol, and mixtures thereof;
   (c) optionally, a hydrophobe; and
   (d) 0.1 to 50 wt. %, based on the amount of polyester polyol, of a clarifier selected from the group consisting of bisphenols, bisphenol alkoxylates, bisphenol polycarbonates, sulfonyl diphenols, and sulfonyl diphenol alkoxylates;
   wherein the polyol has a hydroxyl number within the range of 25 to 800 mg KOH/g,
   wherein the polyol has a Brookfield viscosity less than 10,000 cP at 75° C., and
   wherein the polyol has a seven-day % transmittance at 900 nm of at least 30% as measured by UV/visible spectrophotometry using distilled water as a reference sample, wherein a sample of the polyol is heated at 120° C. for 80 minutes, then allowed to cool at room temperature for 1.0 hour, prior to measuring % transmittance.

2. The polyol of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid and 1,4-cyclohexanedimethanol; isophthalic acid-modified copolymers of terephthalic acid and 1,4-cyclohexanedimethanol; copolymers of 2,2,4,4-tetramethyl-1,3-cyclobutanediol with isophthalic acid, terephthalic acid or orthophthalic derivatives; polyhydroxyalkanoates; polyethylene furanoate; dihydroferulic acid polymers; and mixtures thereof.

3. The polyol of claim 1 wherein the molar ratio of diol to thermoplastic polyester is within the range of 1.5 to 4.5.

4. The polyol of claim 1 comprising 2.0 to 15 wt. %, based on the amount of polyester polyol, of the clarifier.

5. The polyol of claim 1 wherein the clarifier is selected from the group consisting of bisphenol A, bisphenol F, bisphenol acetophenone, ethoxylated bisphenol A, ethoxylated bisphenol F, 4,4'-sulfonyldiphenol, and ethoxylated 4,4'-sufonyldiphenol.

6. The polyol of claim 1 having a hydroxyl number within the range of 35 to 500 mg KOH/g.

7. The polyol of claim 1 having a thirty-day % transmittance at 900 nm of at least 35% as measured by UV/visible spectrophotometry using distilled water as a reference sample, wherein a sample of the polyol is heated at 120° C. for 80 minutes, then allowed to cool at room temperature for 1.0 hour, prior to measuring % transmittance.

8. The polyol of claim 1 comprising 1 to 70 wt. %, based on the amount of thermoplastic polyester, of a hydrophobe selected from the group consisting of dimer fatty acids, oleic acid, ricinoleic acid, tung oil, corn oil, canola oil, soybean oil, sunflower oil, triglycerides or alkyl carboxylate esters having saturated or unsaturated $C_6$-$C_{36}$ fatty acid units, castor oil, alkoxylated castor oil, saturated or unsaturated $C_6$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or fatty acids, and mixtures thereof.

9. A polyurethane prepared from the polyol of claim 1.

10. A curable resin comprising a reaction product of an acrylate or methacrylate source and the polyol of claim 1.

11. A UV-cured coating made from the resin of claim 10.

12. A method for producing the polyester polyol of claim 1, comprising:
   (a) reacting a thermoplastic polyester, the diol, and optionally a hydrophobe at a temperature within the range of 80° C. to 250° C. to produce a digested intermediate;
   (b) mixing or reacting the digested intermediate with the clarifier at a temperature within the range of 20° C. to 250° C. to produce the polyol.

13. A method for producing the polyester polyol of claim 1, comprising reacting a thermoplastic polyester, the diol, an optional hydrophobe, and the clarifier at a temperature within the range of 80° C. to 250° C. to produce the polyol.

14. A polyester polyol comprising recurring units from:
   (a) a digested thermoplastic polyester;
   (b) a diol;
   (c) optionally, a hydrophobe; and
   (d) 0.1 to 50 wt. %, based on the amount of polyester polyol, of a clarifier selected from the group consisting of alkylated phenols, epoxy resins, epoxy novolac resins, diphenylmethanes, and tris(aryloxy)phosphates;

wherein the polyol has a hydroxyl number within the range of 25 to 800 mg KOH/g, and
   wherein the polyol has a seven-day % transmittance at 900 nm of at least 30% as measured by UV/visible spectrophotometry using distilled water as a reference sample, wherein a sample of the polyol is heated at 120° C. for 80 minutes, then allowed to cool at room temperature for 1.0 hour, prior to measuring % transmittance.

15. The polyol of claim 14 wherein the clarifier is selected from the group consisting of butylated hydroxytoluene, m-cresol, p-nonylphenol, styrenated phenols, styrenated phenol alkoxylates, epoxy resins, epoxy novolac resins, diphenylmethane, benzhydrol, and tritolyl phosphate.

16. The polyol of claim 14 comprising 2.0 to 15 wt. %, based on the amount of polyester polyol, of the clarifier.

17. The polyol of claim 14 comprising 1 to 70 wt. %, based on the amount of thermoplastic polyester, of a hydrophobe selected from the group consisting of dimer fatty acids, oleic acid, ricinoleic acid, tung oil, corn oil, canola oil, soybean oil, sunflower oil, triglycerides or alkyl carboxylate esters having saturated or unsaturated $C_6$-$C_{36}$ fatty acid units, castor oil, alkoxylated castor oil, saturated or unsaturated $C_6$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or fatty acids, and mixtures thereof.

18. A polyurethane prepared from the polyol of claim 14.

* * * * *